United States Patent [19]

Hergenrother et al.

[11] 4,223,102
[45] Sep. 16, 1980

[54] POLYPHOSPHAZENE POLYMERS CONTAINING SUBSTITUENTS DERIVED FROM ALKYL OR ARYL CARBAZATES

[75] Inventors: William L. Hergenrother, Akron; Adel F. Halasa, Bath, both of Ohio

[73] Assignee: The Firestone Tire & Rubber Company, Akron, Ohio

[21] Appl. No.: 953,719

[22] Filed: Oct. 20, 1978

[51] Int. Cl.² ............... C08G 79/02; C08G 79/04
[52] U.S. Cl. .................................. 528/168; 528/368; 528/369; 528/374; 528/399
[58] Field of Search ............... 528/369, 399, 168, 368

[56] References Cited

U.S. PATENT DOCUMENTS

| 2,214,769 | 9/1940 | Lipkin | 528/399 |
| 3,893,980 | 7/1975 | Allcock et al. | 528/315 |

*Primary Examiner*—Wilbert J. Briggs, Sr.

[57] ABSTRACT

Polyphosphazene polymers are prepared which contain units represented by the formulas:

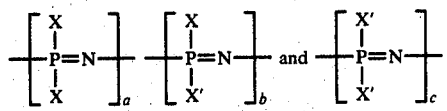

wherein X is —NHNHCOOR in which R is alkyl containing from 1 to 12 carbon atoms, cycloalkyl containing 3 to 12 carbon atoms or aryl; wherein X' is X or is selected from the group consisting of substituted or unsubstituted alkoxy, aryloxy, amino and mercapto groups and wherein $20 \leq (a+b+c) \leq 50,000$ per polymer.

The polymers of the invention can be utilized to form films and may also be utilized in applications for moldings, coatings and the like.

11 Claims, No Drawings

POLYPHOSPHAZENE POLYMERS CONTAINING SUBSTITUENTS DERIVED FROM ALKYL OR ARYL CARBAZATES

BACKGROUND OF THE INVENTION

This invention relates to polyphosphazene polymers containing repeating

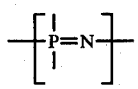

units in the polymer chain in which substituents derived from alkyl or aryl carbazates are attached to the phosphorus atom. More particularly, the invention relates to homopolymers containing substituents represented by the formula —NHNHCOOR (defined below) and to copolymers containing such substituents along with substituted or unsubstituted alkoxy, aryloxy, amino or mercapto groups.

Polyphosphazene polymers containing repeating

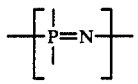

units in which various alkoxy, aryloxy, amino and mercapto groups are attached to the phosphorus atom and their method of preparation are described in the prior art as illustrated in the publications "Nitrogen-Phosphorus Compounds", Academic Press, New York, New York, 1972 by H. R. Allcock and "Poly(Organophosphazenes)", Chemtech, Sept. 19, 1975 by H. R. Allcock and in such U.S. Pat. Nos. as 3,515,688; 3,702,833; 3,856,712; 3,974,242 and 4,042,561, the disclosures of which are incorporated herein by reference.

SUMMARY OF THE INVENTION

In accordance with this invention, polyphosphazene polymers are prepared which contain units represented by the formulas:

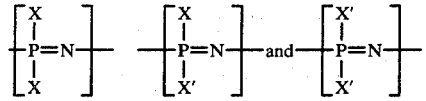

wherein X is represented by the formula —NHNRCOOR in which R is alkyl containing from 1 to 12 carbon atoms, cycloalkyl containing from 3 to 12 carbon atoms or aryl and wherein X' is X or is selected from the group consisting of substituted or unsubstituted alkoxy, aryloxy, amino or mercapto groups.

As will be evident from the above formulas, in instances where X and X' are the same, homopolymers are formed, whereas where X and X' are different, copolymers are formed.

In the copolymer units represented by the above formulas, all X substituent groups may be the same or they may be fixed and all X' substituent groups may be the same or mixed. In the mixtures, the X substituent groups may be mixtures of substituent groups derived from different carbazate groups and the X' substituent groups may be mixtures of alkoxy, aryloxy, amino and mercaptan groups or mixtures of different groups within each class (i.e. different alkoxy, aryloxy etc.).

The specific proportion of X to X' substituent groups incorporated in the polymers of the invention may vary considerably depending upon chemical and physical properties desired in the polymer and the particular end use application for which the copolymer is intended. Thus, for applications such as moldings, coatings, foams and the like, the copolymer should contain at least ten (10) mole percent of the X substituent.

The polymers are prepared by reacting a poly(dichlorophosphazene) having the formula —(NPCl$_2$)$_n$—, in which n is from 20 to 50,000 with an alkyl or aryl carbazate or a mixture of an alkyl or aryl carbazate and a substituted or unsubstituted aliphatic alcohol, aromatic alcohol, amino compound or mercaptan compound in the presence of a tertiary amine. An especially useful alkyl carbazate is ethyl carbazate.

DETAILED DESCRIPTION OF THE INVENTION

The term "polymer" as employed hereinafter throughout the specification and claims is utilized in its broad sense and includes polyphosphazene homopolymers, copolymers, terpolymers and the like.

I. The Poly(Dichlorophosphazane) Polymer

Poly(dichlorophosphazene) polymers which are employed as starting materials in preparing the polymers of this invention are well known in the art as illustrated in U.S. Pat. Nos. 3,370,020; 4,005,171; and 4,055,520, the disclosures of which are incorporated herein by reference.

These polymers have the general formula —(NPCl$_2$)$_n$—, in which n may range from 20 to 50,000 or more. As described in the aforementioned references, the polymers are in general prepared by the thermal polymerization of cyclic oligomers having the formula —(NPCl$_2$)$_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about 10$^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. The Carbazate Substituent

Alkyl or aryl carbazates (i.e. alkyl or aryl esters of carbazic acid, NH$_2$NHCOOH) which may be employed in forming the —NHNHCOOR substituent are those represented by the formula NH$_2$NHCOOR wherein R is alkyl containing from 1 to 12 carbon atoms, cycloalkyl containing from 3 to 12 carbon atoms or aryl. Illustrative of alkyl and aryl carbazates which may be employed are methyl carbazate, ethyl carbazate, n-propyl carbazate, n-butyl carbazate, cycloalkyl carbazate, phenyl carbazate and the like.

The incorporation of carbazates in the polymers of the invention makes the polymers useful in forming fibers, moldings, coatings and the like. In addition, these polymers may be used as complexing agents and the carbazate substituent provides a site for subsequent reactions.

III. The Alkoxy, Aryloxy, Amino and Mercapto Substituents

As indicated heretofore, the polyphosphazene copolymers of this invention in addition to the —NHNH-COOR substituent group may contain substituted or unsubstituted alkoxy, arloxy, amino or mercapto groups or mixtures thereof.

The alkoxy groups (substituted or unsubstituted) may be derived from aliphatic alcohols having from 1 to 20 carbon atoms such as methanol, ethanol, propanol, isopropanol, n-butanol, sec-butanol, hexanol, dodecanol and the like; fluroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7-dodecafluoroheptanol and the like. In instances where it is desired to incorporate mixed X' substitutent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Preferred substituent groups represented by X' for use in these copolymers are substituted or unsubstituted alkoxy groups and aryloxy groups (i.e. —OR groups in which R is a substituted or unsubstituted alkyl or aryl group).

IV. The Tertiary Amine

The use of the tertiary amine in preparing the copolymers of the invention minimizes undesirable side reactions and at the same time acts as an effective acid scavenger.

Tertiary amines which may be employed in preparing the polymers of the invention are those represented by the general structure:

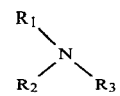

wherein $R_1$, $R_2$, may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N',-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine (TMEDA) and pyridine.

As mentioned heretofore, the polymers of the present invention are prepared by reacting the poly(dichlorophosphazene) polymer, the alkyl or aryl carbazate and if desired other reactants such as an aliphatic alcohol, aromatic alcohol, amino compound or mercaptan compound in the presence of a tertiary amine.

The specific reaction conditions and proportion of ingredients employed in preparing these polymers can vary somewhat depending on factors such as the reactivity of the specific reactants and the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure substantially complete conversion of the chlorine atoms in the polymer to the corresponding esters of the reactant compounds.

The above reaction is ordinarily carried out in the presence of a solvent. The solvent employed in the reaction should be a solvent for the poly(dichlorophosphazene) polymer, the carbazate reactant, other reactants and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the carbazate reactant and other reactants employed in the process should be at least molecularly equivalent to the number of available chlorine atoms in the polymer mixture. However, if desired, an excess of such reactants may be employed in order to insure substantially complete reaction of all the available chlorine atoms.

The following examples are submitted for the purpose of further illustrating the nature of the present invention and are not intended as a limitation on the scope thereof. Parts and percentages referred to in the examples are by weight unless otherwise indicated.

EXAMPLE 1

Preparation of [NP(OCH$_2$CF$_3$) (NHNHCOOC$_2$H$_5$)] Polymer

To a 10 oz. bottle was charged 4.58 grams (44 millimoles) of ethyl carbazate (NH$_2$NHCOOC$_2$H$_5$), 100 cc of dry tetrahydrofuran (hereinafter THF), 12.3 cc of dry triethylamine (88 millimoles), 3.2 cc of dry trifluoroethanol (44 millimoles) and 30.7 grams (40.0 millimoles) of a 15.1 percent solids solution of poly(dichlorophosphazene) polymer, having a degree of polymerization of about 2600, in THF. The solution rapidly turned opaque upon mixing indicating a rapid formation of triethylamine hydrochloride. The bottle was heated at 120° C. for 20 hours. Upon cooling, a milky suspension was observed which did not settle along with needles of triethylamine hydrochloride. The milky suspension layer was coagulated in hexane and produced 4.1 grams of a white powdery polymer. Washing the salt with methanol produced an additional 0.6 grams of white powder.

A sample of the white powdery polymer product was pressed at 150° C. and 120 psi and produced a clear, hard film. Elemental analysis of the polymeric product showed the following:

|  | % C | % H | % N | % P | % Cl |
|---|---|---|---|---|---|
| Actual | 25.28 | 4.16 | 19.93 | 14.29 | 2.15 |
| *Calculated | 25.28 | 4.16 | 19.93 | 14.29 | 2.15 |

*Based upon composition consisting of 0.6% triethylamine hydrochloride, 3.3% unreacted chloropolymer, 2.7% hydrolyzed chloropolymer, 39.0% trifluoroethanol derivative and 60.1% ethyl carbazate derivative.

EXAMPLE 2

Preparation of [NP(OC$_6$H$_5$CL-p) (NHNHCOOC$_2$H$_5$)] Polymer

To a 10 oz. bottle was charged 4.58 grams (44 millimoles) of ethyl carbazate (NH$_2$NHCOOC$_2$H$_5$), 100 cc of THF, 4.43 cc (44 millimoles) of p-chlorophenol (p-C$_6$H$_5$OH), 12.3 cc (88 millimoles) of triethylamine and 35.4 grams of a 13.0 percent solids solution of poly(dichlorophosphazene) having a degree of polymerization of about 2600, in THF. The reaction mixture was heated at 120° C. for 20 hours. Upon cooling, a milky suspension was observed which did not settle along with needles of triethylamine hydrochloride. The suspension layer was subjected to Infrared Spectroscopy and showed virtually no P-Cl band at 600 cm$^{-1}$ indicating excellent conversion. New bands were observed at 583, 543 and 512 cm$^{-1}$. The milky suspension layer was coagulated in methanol and produced 10.08 grams of a white polymeric plastic.

Claims:

1. A polyphosphazene polymer containing units represented by the formulas:

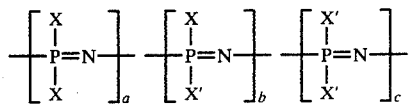

wherein X is —NHNHCOOR in which R is alkyl containing from 1 to 12 carbon atoms, cycloalkyl containing from 3 to 12 carbon atoms or aryl; wherein X' is X or is selected from the group consisting of substituted or unsubstituted alkoxy, aryloxy, amino and mercapto groups and wherein 20≦(a+b+c)≦50,000 per polymer.

2. The polymer of claim 1 wherein X is —NHNHCOOC$_2$H$_5$.

3. The polymer of claim 1 wherein X is —NHNHCOOC$_2$H$_5$ and X' is —OCH$_2$CF$_3$.

4. The polymer of claim 1 wherein X is —NHNHCOOC$_2$H$_5$ and X' is p-ClC$_6$H$_5$O—.

5. A method of preparing polyphosphazene polymers containing units represented by the formulas:

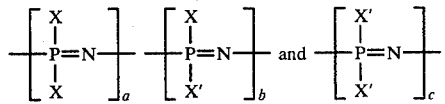

wherein X is —NHNHCOOR in which R is alkyl containing from 1 to 12 carbon atoms, cycloalkyl containing from 3 to 12 carbon atoms or aryl; wherein X' is X or is selected from the group consisting of substituted or unsubstituted alkoxy, aryloxy, amino and mercapto groups and wherein 20≦(a+b+c)≦50,000 per polymer; which method comprises reacting a polydichlorophosphazene polymer having the formula —(NPCl$_2$)$_n$—, in which n is from 20 to 50,000, with an alkyl or aryl carbazate having the formula NH$_2$NHCOOR in which R is alkyl containing from 1 to 12 carbon atoms, cycloalkyl containing from 3 to 12 carbon atoms or aryl or a mixture consisting of said carbazate and an aliphatic alcohol, aromatic alcohol, amino compound or mercaptan compound, or mixture thereof, in the presence of a tertiary amine.

6. The method of claim 5 wherein said alkyl carbazate is ethyl carbazate.

7. The method of claim 5 wherein said mixture is a mixture of an alkyl carbazate and an aliphatic alcohol.

8. The method of claim 7 wherein said alkyl carbazate is ethyl carbazate and said aliphatic alcohol is trifluoroethanol.

9. The method of claim 5 wherein said mixture is a mixture of an alkyl carbazate and an aromatic alcohol.

10. The method of claim 9 wherein said alkyl carbazate is ethyl carbazate and said aromatic alcohol is p-chlorophenol.

11. The method fo claim 5 wherein said tertiary amine is triethylamine.

* * * * *

UNITED STATES PATENT AND TRADEMARK OFFICE
CERTIFICATE OF CORRECTION

PATENT NO. : 4,223,102
DATED : September 16, 1980
INVENTOR(S) : William L. Hergenrother and Adel F. Halasa It is certified that error appears in the above—identified patent and that said Letters Patent are hereby corrected as shown below:

Column 1, line 64

"fixed" should read -- mixed --

Signed and Sealed this

Twenty-third Day of December 1980

[SEAL]

Attest:

SIDNEY A. DIAMOND

Attesting Officer

Commissioner of Patents and Trademarks